March 17, 1953 R. H. WRIGHT 2,631,624
SCREW DRIVER
Filed Feb. 25, 1950

INVENTOR.
Roland H. Wright
BY Robert J. Palmer
ATTORNEY

Patented Mar. 17, 1953

2,631,624

UNITED STATES PATENT OFFICE 2,631,624

SCREW DRIVER

Roland H. Wright, Brockton, Mass.

Application February 25, 1950, Serial No. 146,189

1 Claim. (Cl. 145—50)

This invention relates to screw drivers, and has as an object, to prevent the driving ends of such drivers from slipping out of the slots in the heads of screws when twisting force is applied.

The blade of the usual screw driver is tapered towards its driving end and when a strong twisting force is applied to it, on account of the taper, it slips out of the slot of a screw. This also happens, though to a less extent, when a screw driver blade is not tapered towards its driving end.

This invention provides a screw driver which is tapered in both dimensions away from its driving end, so that the only contact its driving end makes with the sides of a slot in a screw, is edge contact, whereby when the screw driver is twisted, the driving edges tend to dig into the sides of the slot through the twisting force being concentrated at such edges. It is preferred that the end of the driver which contacts the bottom of a slot in a screw, be concave whereby its contact with the bottom of a slot also is edge contact.

The invention will now be described with reference to the drawing, of which:

Figure 1:
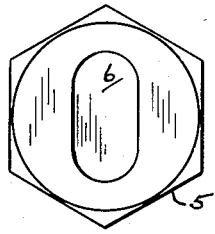
Fig. 1 is a plan view looking downwardly upon the head of a machine screw having a slot particularly suited for use with a screw driver embodying this invention.
Figure 2:
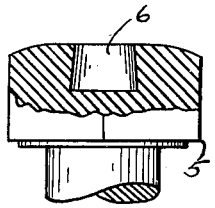
Fig. 2 is a fragmentary side elevation, partially in section, of the screw head of Fig. 1, the slot in the head having sides diverging towards its bottom.
Figure 3:
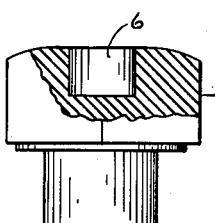
Fig. 3 is a side elevation, partially in section, of a machine screw having a slot with non-diverging sides.
Figure 4:
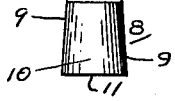
Fig. 4 is an end elevation of the driving portion of a screw driver embodying this invention.

The machine screw 5 of Figs. 1, 2 and 3, has a slot 6 in its head, the slot having rounded ends. In the head illustrated by Fig. 2 of the drawing, the slot has sides which diverge towards its bottom. In the screw head illustrated by Fig. 3, the slot has non-diverging sides. Either shape of slot is suited for use with the screw driver illustrated by Figs. 4, 5 and 6.

Figure 5:
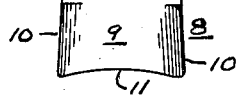
Fig. 5 is a side elevation of the screw driver of Fig. 4.
Figure 6:
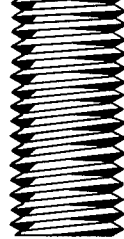
Fig. 6 is a plan view looking at the end of the screw driver.
Figure 6:
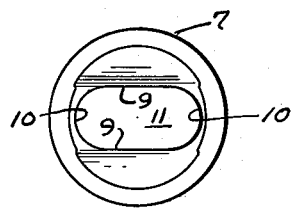

The screw driver illustrated has a shank portion 7 and has a driving portion 8 of reduced area, the portion 8 having greater length than thickness, having the straight longitudinally extending sides 9, and having the rounded transversely extending sides 10. The sides 9 diverge towards the driving end 11 of the screw driver as do the sides 13. As illustrated by Fig. 5 of the drawing, the driving end of the screw driver is concave, whereby the only contact it can make with the bottom of a slot in a screw, is edge contact.

When the driving end of the screw driver is placed in a slot in a head of a screw such as the slot 6 in Fig. 1 of the drawing, the only surface of the driver which contacts the sides of the slot, is the sharp edge at the driving end 11. Thus, all the twisting force applied to the screw driver is concentrated at this edge, thus preventing the slipping of the driving end of the screw driver from the slot.

This construction enables the driving end of the screw driver to be rounded at its sides of least dimension, and permits the corresponding sides of the slots in the screws to be driven, to be rounded, thus reducing the manufacturing cost, and eliminating failures due to breakages at sharp corners.

The invention is applicable to screw drivers for wood and metal screws, including machine and self-threading screws.

While one embodiment of the invention has been described for the purpose of illustration, it should be understood that the invention is not limited to the exact apparatus illustrated, since modifications thereof may be suggested by those skilled in the art, without departure from the essence of the invention.

What I claim is:

In combination, a screw having a head with a relatively narrow, relatively long slot having straight, parallel longitudinal sides, said slot having transversely extending rounded ends that are substantially spaced from adjacent edges of the head, said sides extending in parallel planes from one of said ends to the other, said slot having substantially the same width and length at its bottom as at the surface of said head, and a driver for said screw having transverse and longitudinal sides which diverge towards its driving end, said driving end being shaped longitudinally and transversely to conform with said slot except for having slightly smaller dimensions, said rounded ends of said slot having radii of curvature substantially less than one-half the length of said slot, and said driving end having rounded ends having radii of curvature slightly smaller than the radii of curvature of said rounded ends of said slot.

ROLAND H. WRIGHT.

REFERENCES CITED

The following references are of record in the file of this patent:

UNITED STATES PATENTS

| Number | Name | Date |
|---|---|---|
| 386,092 | Rogers | July 10, 1888 |
| 1,479,506 | Kellemen | Jan. 1, 1924 |
| 1,741,349 | Sullivan | Dec. 31, 1929 |
| 1,899,489 | Wickbergh | Feb. 28, 1933 |
| 2,142,185 | Fieg | Jan. 3, 1939 |
| 2,248,695 | Bradshaw | July 8, 1941 |
| 2,362,999 | Hewitt | Nov. 21, 1944 |

FOREIGN PATENTS

| Number | Country | Date |
|---|---|---|
| 85,913 | Switzerland | July 16, 1920 |